R. L. PARSHALL.
VENTURI FLUME WATER STAGE RECORDING INSTRUMENT.
APPLICATION FILED JULY 27, 1921.
1,417,941.  Patented May 30, 1922.
5 SHEETS—SHEET 5.
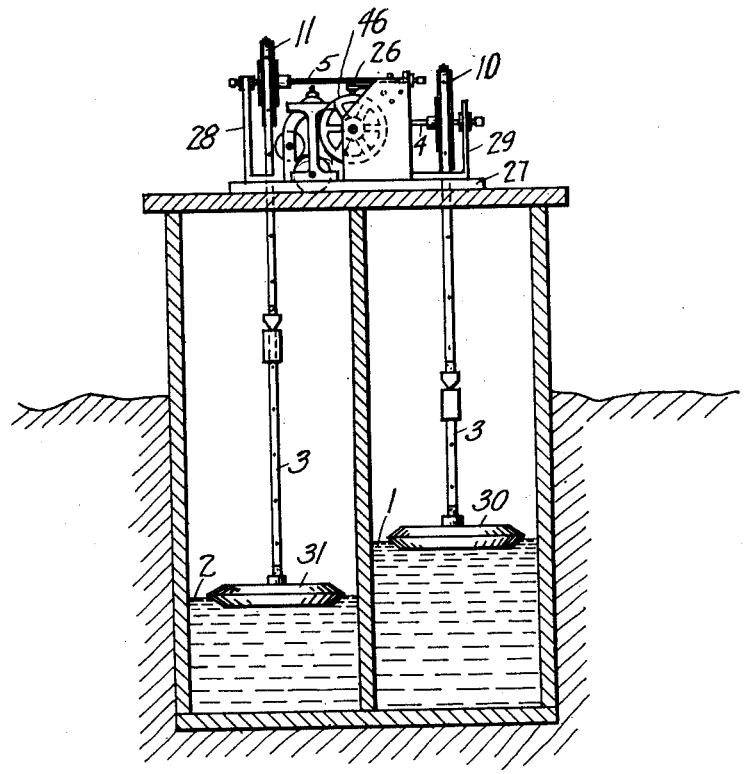
FIG. 4.
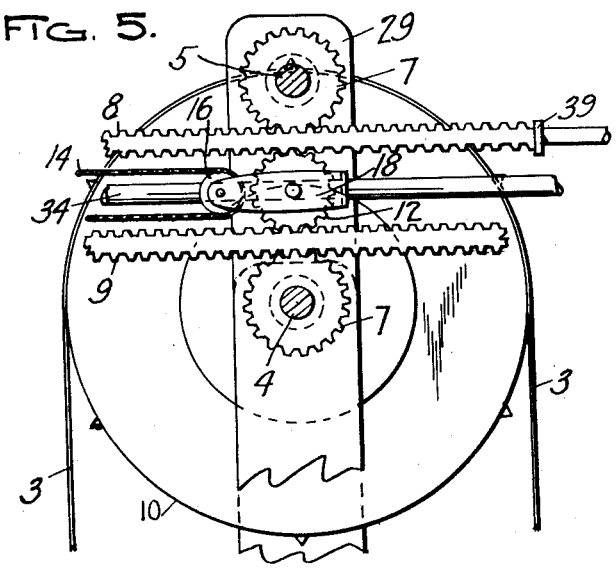
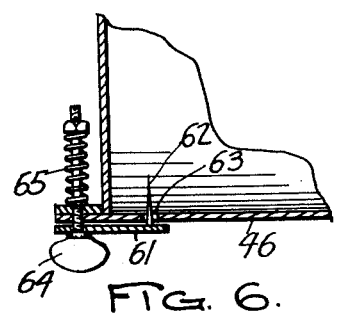
FIG. 6.
INVENTOR.
Ralph L. Parshall

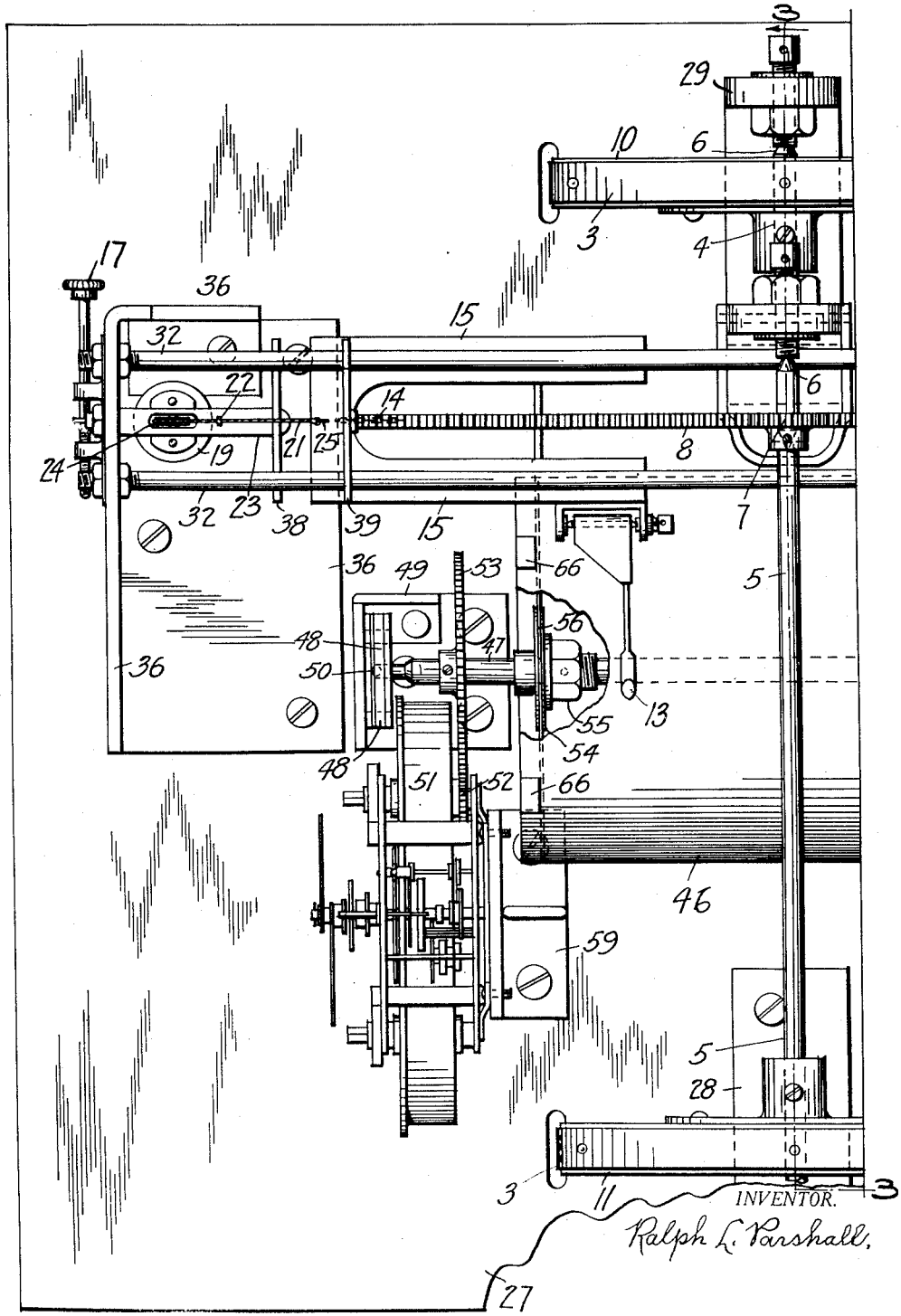
FIG. 1-A.

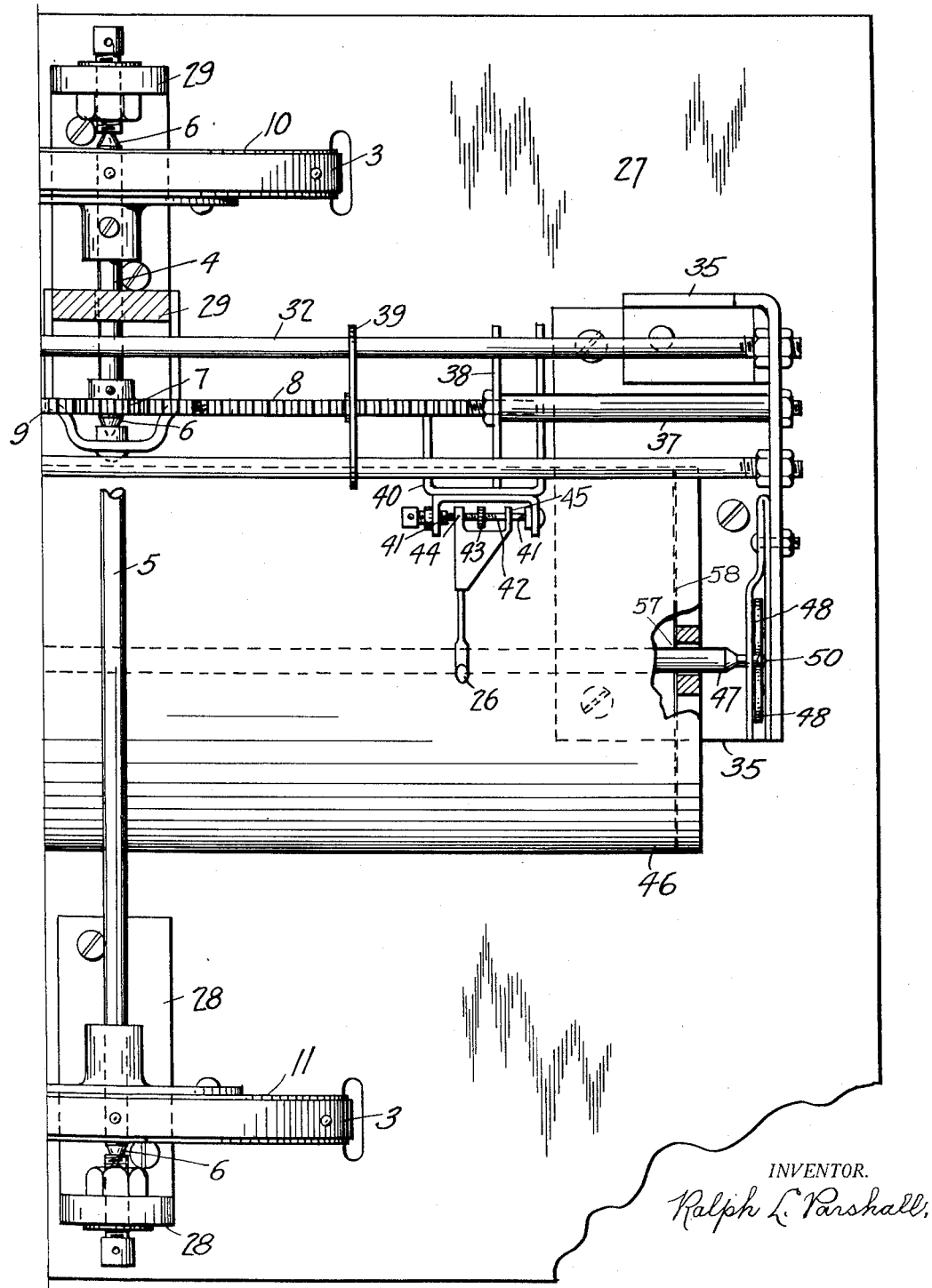
FIG. 1-B.

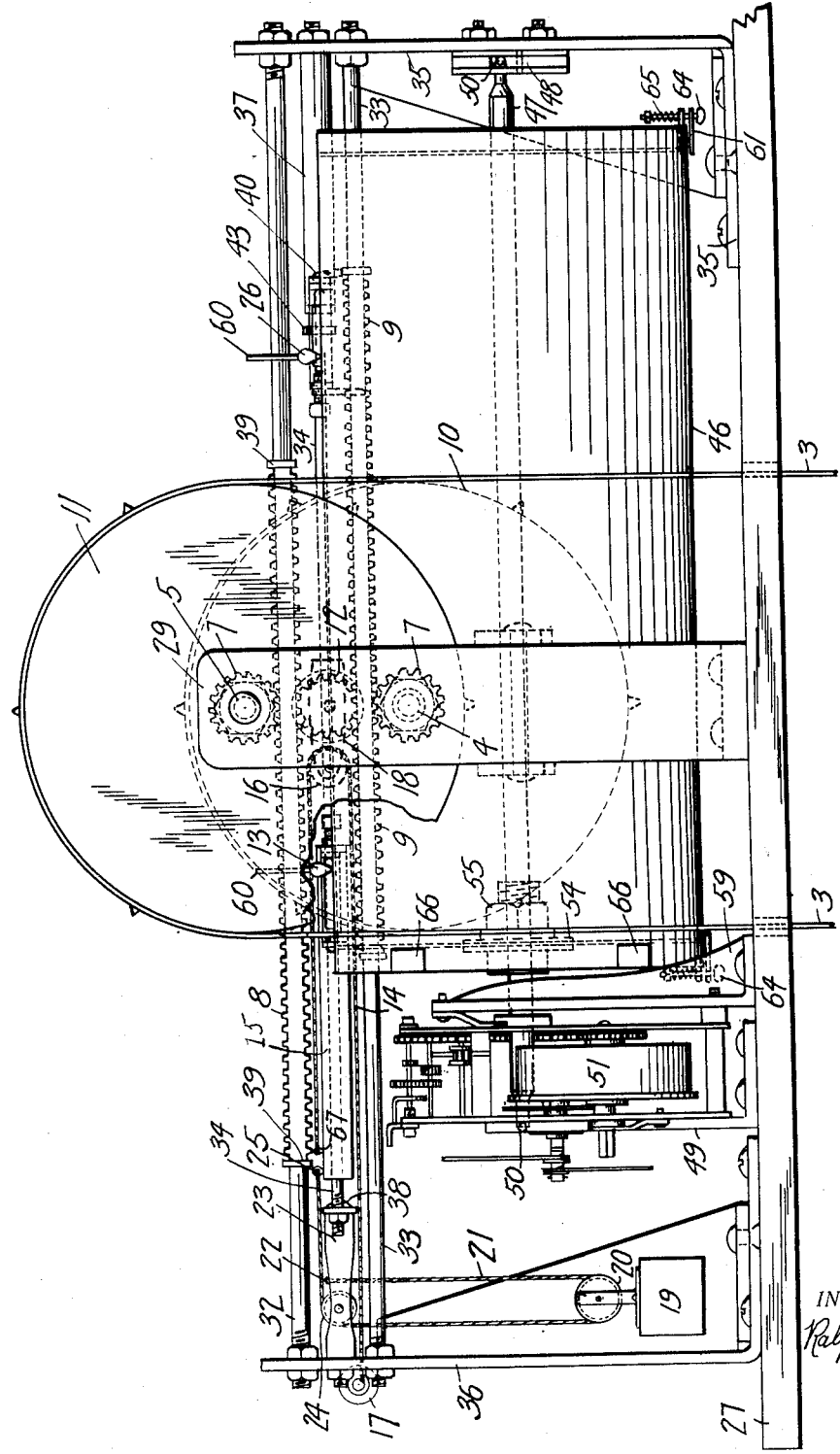

UNITED STATES PATENT OFFICE.

RALPH L. PARSHALL, OF FORT COLLINS, COLORADO.

VENTURI-FLUME WATER-STAGE-RECORDING INSTRUMENT.

1,417,941.  Specification of Letters Patent.  Patented May 30, 1922.

Application filed July 27, 1921. Serial No. 488,009.

(FILED UNDER THE ACT OF MARCH 3, 1883, 22 STAT. L., 625.)

*To all whom it may concern:*

Be it known that I, RALPH L. PARSHALL, a citizen of the United States of America, and an employee of the Department of Agriculture, residing at Fort Collins, Colorado (whose post-office address is Fort Collins, Colorado), have invented a new and useful Venturi-Flume Water-Stage-Recording Instrument.

This application is made under the act of March 3, 1883, chapter 143 (22 Stat., 625) and the invention herein described and claimed may be used by the Government of the United States, its officers and employees, and by any person in the United States without payment to me of any royalty thereon. I hereby dedicate the same to the free use of the Government and the people of the United States.

The Venturi flume water stage recording instrument was designed to operate in connection with the Venturi flume, a device for measuring flowing water.

The principle underlying the design of this instrument is simple, and is based on the fact that if a sphere is tangent to two parallel plane surfaces and these surfaces are moved equal distances in opposite directions, the sphere will suffer no displacement. If the movement of the plane surfaces in opposite directions is not equal, the sphere will be displaced an amount proportional to the difference of this movement. If one plane is stationary, the displacement of the sphere will be one-half the movement of the moving plane.

To incorporate this principle in the design was an easy matter by substituting an idle gear wheel for the sphere, and the plane surfaces by simple racks with a common pitch. To adapt this principle, it is only necessary to have the water surface of the upper head condition actuate one of these racks and the throat head the other. If both water surfaces representing the depth are first assumed to be equal, and then both raised or lowered an equal amount, then, by a simple mechanical arrangement of floats, this change of condition is communicated to the instrument. Since the water surfaces are changed an equal amount, there would be no resulting difference in their elevation. This common movement causes each rack to be displaced an equal amount, but in opposite directions, and, as first stated, this will cause no lateral movement of the idle gear wheel placed between the two parallel racks. Should the change in the two water surfaces be unequal, then there will result a difference in elevation or depth, which, in turn, will cause a displacement or lateral movement of the idle gear wheel. The mechanical arrangement is such as to record proportionally the difference. Not only is the difference in heads or depths required, but also the value of the upper head. Since the simple movement of one of the racks is directly proportional to this value of the upper head, therefore there is little mechanical difficulty in recording this factor.

The mechanical detail will now be discussed with reference to the accompanying drawings. These drawings consist of six views, namely:

Figures 1$^A$ and 1$^B$ represent a plan view of the invention;

Figure 2 represents a view in elevation;

Figure 3 a sectional view of the invention through its principal transverse axis, 3—3, Fig. 1$^A$;

Figure 4 represents elevation of instrument mounted on float wells, showing floats and water surfaces;

Figure 5 represents detail view of racks and idle gear wheel;

Figure 6 represents detail showing paper clip for holding record sheet in place on cylinder.

Figure 3:
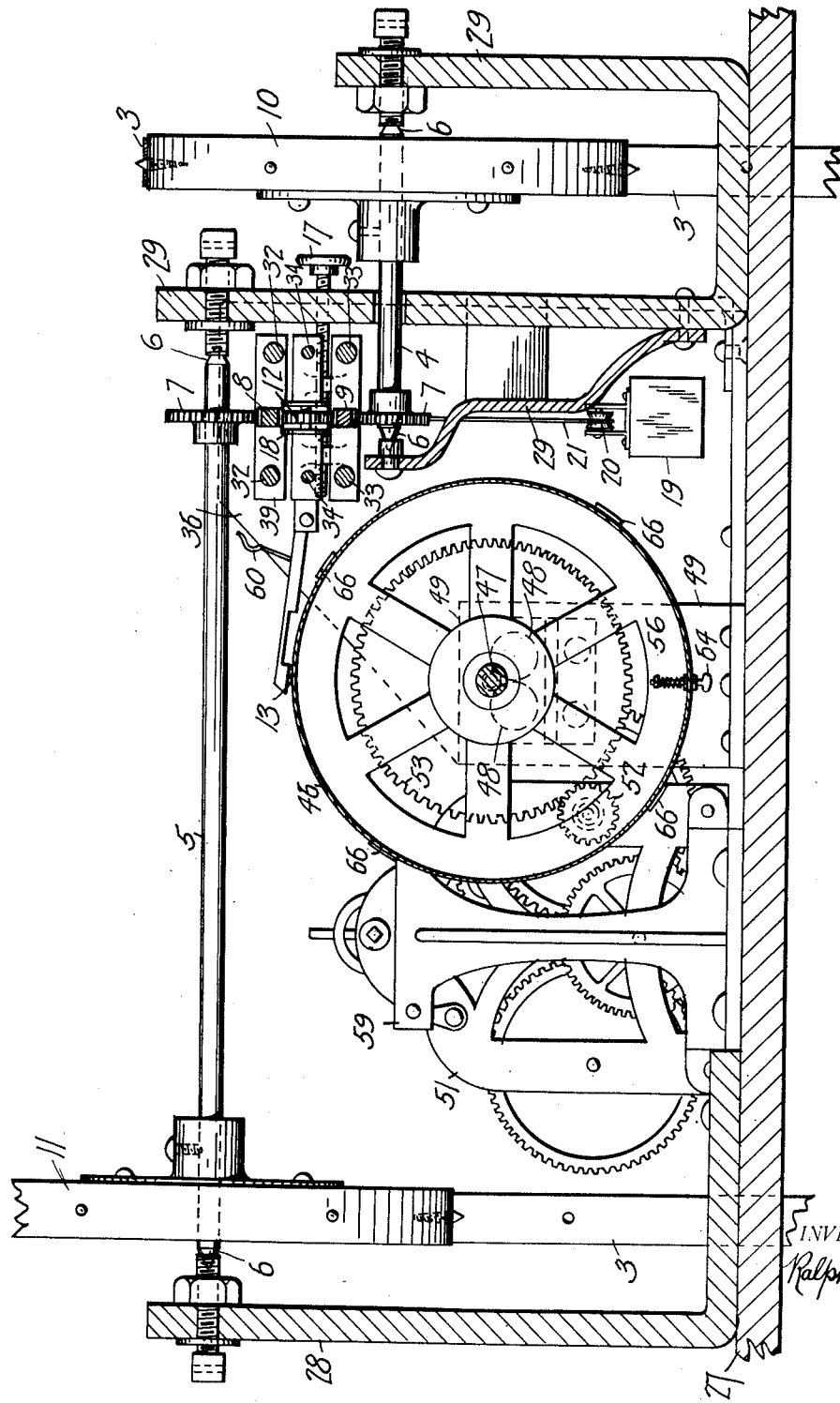

The movement of the two water surfaces 1 and 2 is communicated to the instrument by means of two metal floats and counter weights suspended on a perforated metal ribbon tape. These tapes, 3, pass over the drive wheels, 10 and 11, causing the shafts, 4 and 5, to rotate about their pivot bearings, 6. Fixed to these shafts, 4 and 5, are pinions, 7, provided with hub and set screw. These pinions engage the racks, 8 and 9.

To trace out the movement, assume that the water surface 2, is raised an appreciable amount. This change causes the drive wheel, 11, to rotate clockwise, as viewed in Figure 2, causing the rack, 8, to shift to the left. The increase in the elevation of the water surface, 2, decreases the difference in elevation between the surfaces 1 and 2. Since the surface 1 remains unchanged, there will be no movement of the drive wheel, 10, or the rack, 9. The movement of the surface, 2, and the corresponding shift of rack, 8, which is proportional to the change in the difference, causes the idle gear wheel, 12, to move in the same direction as the rack. This change in the position of the idle gear wheel, 12, is directly proportional to the change in the difference of the two water surfaces, but only represents one-half the value. To cause the displacement of 12 to record the true difference, it is necessary here to introduce the principle of the law of the pulley. The pen, 13, records graphically this difference, and to cause the correct movement of the pen, a small link chain 14 is attached at 67 to a sliding frame, 15, carrying the pen, thence to the small sheave wheel, 16, and then back to the adjusting post, 17. The small sheave wheel, 16, is supported by a yoke, 18, the yoke in turn attached to the gear wheel, 12, by means of a loose fitting pin through the axis of the gear wheel. The counter weight, 19, with attached small sheave wheel, 20, actuates the sliding frame, 15, by means of the flexible cord, 21. This cord is attached at 22 to the supporting post 23, thence downward to the small sheave 20, back over the second small sheave, 24, and then attached to the sliding frame 15 at 25. To follow the movement above cited, it was assumed that the rack, 8, shifted to the left and also the idle gear, 12, moved one-half this amount in the same direction, or to the left. As 12 moved also 16 moves an equal amount, and the counter weight, 19, descends through this same distance. As the counter weight descends, the point, 25, moves double the distance, and as the point 25 is common to the sliding frame and pen, it follows that the pen records the true value of the change in the water surface 2. If it is assumed that the water surface, 1, has been lowered and the surface 2 has remained constant, there would result a decrease in the difference in elevation of the two surfaces. Decreasing 1 causes the drive wheel, 10, to rotate in a counter-clock-wise direction, as viewed in Fig. 2, and thus the idle gear wheel, 12, is moved to the left, as in the former case cited. An increase in the difference in the elevation of the two water surfaces causes the idle gear wheel, 12, to shift to the right, and likewise the recording pen, 13, is displaced to the right or direction of greater value on the record sheet. The simultaneous movement of the two surfaces where both receive the same increase or decrease will maintain a constant difference during this change. Such a condition will not shift the idle gear wheel, 12, either to the left or right; because as 8 shifts either right or left, 9 will move the same amount left or right, causing 12 to assume a fixed position.

As previously stated, the instrument not only records the difference in elevation of the two water surfaces, but also the value of the depth of the water at 1 above the floor of the flume, or the upper head. Attached to the rack, 9, is the pen 26. Any change in the water surface, 1, is directly communicated to the pen, 26, such that as 1 rises the drive wheel, 10, rotates clockwise, causing the rack, 9, to move to the right, or in the direction of greater value on the record sheet.

The instrument consists of a rectangular base, 27, mounting two rigid supports, 28 and 29, that are provided with adjustable pivot bearings, 6. These two main supports carry the two shafts, 5 and 4, and the two drive wheels, 11 and 10. These wheels, 10 and 11, are operated by two individual floats, 30 and 31, the movement being transmitted by metal tapes, 3. These tapes are of standard design, commonly used for such purposes. The drive wheels are provided with six projecting metal points equally spaced about the circumference, and the perforations in the tape are so spaced that they accurately agree with the projections on the wheels. Such an arrangement is necessary to insure a positive turning of the wheels as the floats move throughout their range of action. The turning of these two wheels causes the racks previously mentioned to move laterally on fixed parallel guide rods. Both racks, 8 and 9, are double in the sense of having teeth on both edges, where one side or edge engages with the pinions, 7, and the other with the idle gear wheel, 12. The pitch of the racks and pinions are the same for the model instrument. The guide rods, 32, support the rack 8, and 33 are the guide rods for the rack, 9. The sliding frame 15, which carries the difference in head pen, 13, is supported by the guide rods, 34. The guide rods 32 and 33 are supported at their ends by means of rigid metal supports, 35 and 36. The holes in these supports, 35 and 36, for the guide rods are oversize, sufficient to permit of adjusting the rods to their true position. Due to the lightness in weight of the guide rods 34, they do not extend directly to the supports 35 and 36, but are held in place by two rigid posts, 23 and 37. These two supporting posts are in the form of a letter T, the bases of which are attached to the plates 35 and 36, and the guide rods, 34, made fast to the arms, 38. The two guide rods, 34, are parallel, and when in position are contained in a horizontal plane midway between the two horizontal planes containing the main guide rods, 32 and 33. The pair of guide rods, 32, carry the rack 8. This rack has at each end a piece at right angles. Thin cross pieces, 39, have attached at their mid-points the rack 8, and at their ends have provided holes of sufficient size to slide easily on the rods, 32. The rack 9 is of similar construction. At the end of the rack, 9, is attached the support 40, for the pen, 26, which inscribes the record of the value of the upper head. This support is rigidly fixed to the rack and cross-bar, and carries two pivot bearings, 41. About these two bearings turns the small shaft, 42, that carries the pen arm. This shaft, 42, is threaded on one end and has a knurled collar, 43, near its middle point. This threaded portion is turned into the tapped hole at 44. The projection, 45, of the pen arm, is a loose fit on the smooth portion of the shaft 42. The purpose of this arrangement is for accurately setting the pen to agree with the measured determination of the value of the upper head. Obviously, by turning the knurled collar, 43, the pen may be shifted to the right or left and yet permit the pen to be moved in a vertical plane, such vertical movement being necessary to follow the inequalities of the record sheet, and also to permit the pen to be raised when substituting a new sheet. No springs are necessary to give the pen the proper tension against the paper record sheet.

The sliding frame, 15, carried on the guide rods 34, is a U shaped metal piece provided with holes at its ends that fit loosely on the guide rods. This U design permits of greater distance between the bearing points, and for extreme difference in head will permit the movement to the right without interference with the idle gear wheel, 12. At the end of this frame is carried the support for the difference, pen, 13. The detail of construction is quite similar to that of the upper pen arrangement; however, the adjusting feature is omitted. To adjust the difference in head pen to the correct observed value it is only necessary to turn the adjusting post, 17. The turning of this adjusting post simply lengthens or shortens the small chain, 14, of the pulley system, and thus displaces the pen, 13, to the right or left the desired amount.

The record sheet upon which the upper head and difference graphs are drawn is of special design. This record sheet is carried on the revolving cylinder, 46, the cylinder 46 being supported by the shaft, 47, which rotates about the roller bearings, 48. This bearing, 48, is supported by the vertical support 35 and is adjustable to permit of getting the axis of the cylinder parallel to the guides carrying the pens, 13 and 26. At the left end of the shaft, 47, as seen in Figs. 1 and 2, the roller bearing, 48, is supported by a special piece, 49, made fast to the base, 27, of the instrument. At either end of the shaft 47 is embedded a small steel ball, 50, the purpose of which is to eliminate friction and to reduce the end play of the cylinder to a minimum. It is obvious that any lateral shift in the position of the cylinder will result in an error in the record on the sheet.

The quantity of water passing through the Venturi flume is measured in cubic units per second, of time, and to correctly record the flow the record sheet and cylinder must be revolved proportionally to a time interval. This interval is assumed in the design to be one week, and constitutes one revolution of the cylinder bearing the record sheet. A clock movement, 51, Seth Thomas No. 10, is geared to the shaft, 47, by means of two special gears, 52 and 53. The gear 52 is attached to the spring barrel of the clock, and the gear wheel 53 is fixed rigidly to the shaft, 47. To permit of adjusting the record sheet to the proper time after sheet is placed on cylinder, a special friction drive is provided at 54. The arrangement is simple, and by tightening the nut, 55, a spring washer is clamped against the cylinder head, 56. This whole arrangement is fixed to the shaft, 47, and with the desired tension in the spring washer, the cylinder may be turned about the shaft. At 57 the cylinder head 58 fits loosely on the shaft, 47. The clock driving the cylinder is mounted on a special support, 59.

The two pens, 13 and 26, are of special design and of sufficient size to hold an ink supply for a considerable period. These pens are tubular in form with the nibs projecting from the bottom side. The pen is closed at one end, the other open for the purpose of filling. This design of pen permits of movement in either direction as well as transversely, producing a uniform line. A spring wire, 60, of special shape, is mounted on each pen arm and clamps on the guide rod, 32. This is only a matter of convenience in holding the pens out of the way when it is necessary to change the sheets on the cylinder.

A special device is provided for holding in place the record sheet on the cylinder, 46. This arrangement consists of a short metal arm, 61 (Fig. 6) carrying a needle point, 62, which fits into a small hole, 63, in the cylinder, 46. The knurled head, 64, is lifted, causing a compression in the coiled spring, 65. This movement raises the needle point, 62, free from the hole, 63. After raising the knurled head, 64, it is rotated until the arm, 61, is clear of the edge of the record sheet. After the new record sheet is mounted in place, the arm, 61, is rotated into position and by pressing the knurled head, 64, the needle point perforates the lapped ends of the record sheet and seats itself in the hold, 63, in the cylinder. The coiled spring, 65, provides sufficient tension to hold the record sheet in place. At the clock end of the cylinder, 46, projecting lugs, 66, are provided which fix the position of the record sheet on the cylinder.

Primarily, the instrument was designed to operate exclusively in connection with the Venturi flume, but it can be made to function under any condition where a difference in water surface is desired as well as the value of one of these depths.

I claim:

1. A Venturi flume recorder comprising a sliding carriage, a differential gear adapted for translational movement with a two for one ratio attachment including a pulley supported from the differential gear for actuating the sliding carriage, the latter supporting a scribing instrument.

2. A recorder for Venturi flumes with a differential connection to the floats consisting of two stationary gear wheels, two horizontally movable racks respectively actuated thereby and a shiftable gear engaged by the racks, to reciprocate a marker carriage translationally in proportion to the difference of the water levels.

3. The device as set forth in claim 2, one of the movable racks carrying a water level marker.

4. In an apparatus for recording the upper head and difference in head as applied to the Venturi flume, including a differential movement, of gears on parallel shafts for actuating parallelly movable racks, the latter acting to impart movements of translation to a laterally shiftable gear, said gear having a two to one connection to a shiftable marker carriage, and a marker on the carriage for recording the difference in head.

5. The combination recited in claim 4 in which one of the racks carries a marker to record the water level or head.

In testimony whereof, I affix my signature in the presence of two witnesses.

RALPH L. PARSHALL.

Witnesses:
ROBERT E. TRIMBLE,
ANNA T. BAKER.